Dec. 11, 1962  H. W. EUKER ET AL  3,067,684
TRAJECTORY SENSITIVE TIME ACTUATING SYSTEMS
Filed July 27, 1960  3 Sheets-Sheet 1

INVENTORS:
HAROLD W. EUKER,
GORDON L. FOGAL,

BY T. E. Kristofferson

THEIR ATTORNEY.

Dec. 11, 1962       H. W. EUKER ET AL       3,067,684
TRAJECTORY SENSITIVE TIME ACTUATING SYSTEMS
Filed July 27, 1960                3 Sheets-Sheet 2
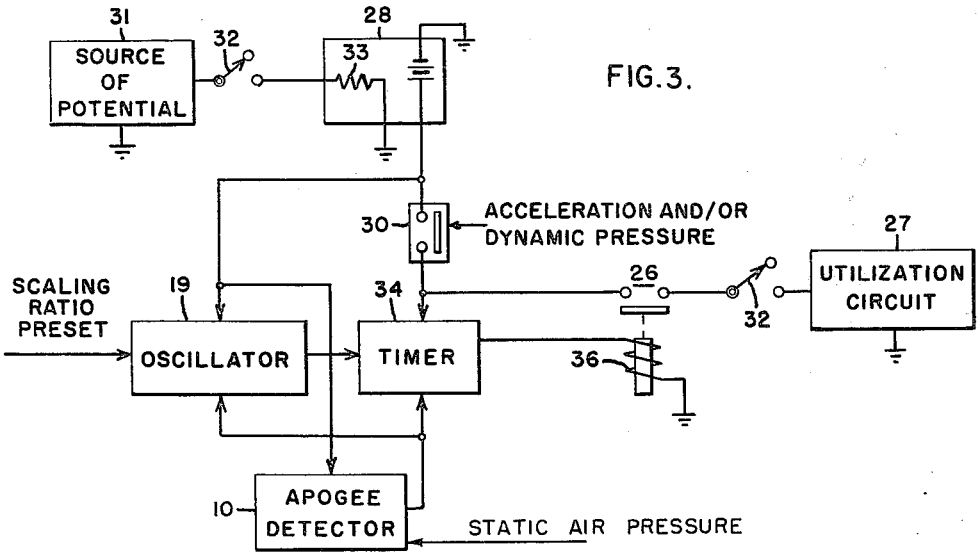
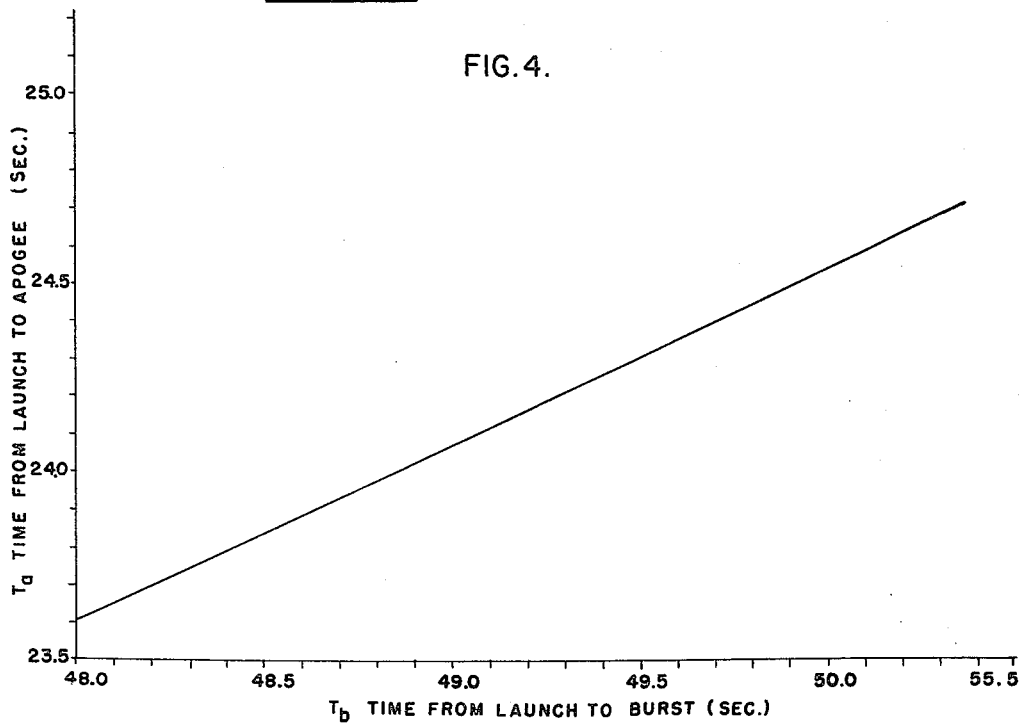
INVENTORS:
HAROLD W. EUKER,
GORDON L. FOGAL,
BY T. E. Kristofferson
THEIR ATTORNEY.

INVENTORS:
HAROLD W. EUKER,
GORDON L. FOGAL,

BY T. E. Kristoffersen

THEIR ATTORNEY.

United States Patent Office 3,067,684
Patented Dec. 11, 1962

3,067,684
TRAJECTORY SENSITIVE TIME ACTUATING SYSTEMS
Harold W. Euker, Jenkintown, and Gordon L. Fogal, Wayne, Pa., assignors to General Electric Company, a corporation of New York
Filed July 27, 1960, Ser. No. 45,726
9 Claims. (Cl. 102—70.2)

This invention relates to systems for the arming and fuzing of missiles or for actuating to perform any other function at a preselected point in the trajectory. More particularly, the invention involves such a system sensitive to trajectory parameters and independent of total flight time.

In the prior art, missiles have been actuated by means of devices such as baroswitches, timing devices, etc. Many of the baroswitches employed have been large, heavy and somewhat inaccurate due to pressure variations caused by varying atmospheric conditions. An improved form of baroswitch is described in a co-pending application entitled "Barometric Probe System" by the inventors of this invention, Serial No. 862,680, filed December 29, 1959 and assigned to the same assignee as the present invention. Systems relying on timing alone have been inaccurate due to the variations in the total flight time, particularly in relatively unsophisticated missiles without advanced guidance systems. Other approaches to arming and fuzing have incorporated the use of a signal transmitted by means of radar. Such a signal may be subject to jamming. Accordingly, it is an object of this invention to provide an actuating system that is entirely self-contained in the missile.

Another object of the invention is to provide such a system requiring minimum weight and space.

Still another object is to provide a system for actuating a mechanism based upon the actual trajectory traversed by the missile, rather than on a trajectory estimated before the time of flight.

Still another object is to provide a passive jam-proof system having an accuracy corresponding to that of a radar fusing system.

Still another object is to provide a system insensitive to intervening terrain and having increased accuracy at low trajectories.

A further object is to provide a trajectory sensitive actuating system capable of solving the actual trajectory time equation in order to actuate a device a specific time before impact.

A still further object is to provide an actuating system independent of total flight time of the missile due to a capability of detecting apogee and operating on the basis of time symmetry, or specified variation from symmetry, around apogee.

A still further object is to provide a missile actuated by a timer which operates on the total actual flight time.

A still further object of the invention is to provide such a system employing a timing device sensitive to the variation from the symmetry of a vacuum trajectory caused by the atmosphere.

In carrying out the invention in one form thereof, a reversible timer is provided which can be preset in the negative direction a preselected number of counts corresponding to the desired time before impact at which it is desired to actuate. The counting rate of the timer is controlled by a stabilized oscillator, and the timer is started upon firing the missile. A probe system employing a pressure transducer is used to detect the point of apogee, at which point a signal is emitted to reverse the direction of the counter and to modify the counting rate in accordance with a preset scaling ratio required due to the differences in trajectory symmetry during ascent and descent caused by the atmosphere. When the counter returns to zero, a signal is emitted to actuate whatever is desired, such as arming, fuzing, detonating, etc.

The novel features which are believed to be characteristic of the invention are set forth with particularity in the appended claims. The invention itself, however, together with further objects and advantages thereof can best be understood by reference to the following description taken in connection with the accompanying drawings in which:

FIGURE 3 is a schematic circuit diagram partly in block form illustrating the switching functions involved in the embodiment of FIGURE 1;

FIGURE 4 is a graph of the time from launch to apogee versus the time from launch to burst under atmospheric conditions for a particular missile for random 35° elevation trajectories;

Figure 1:
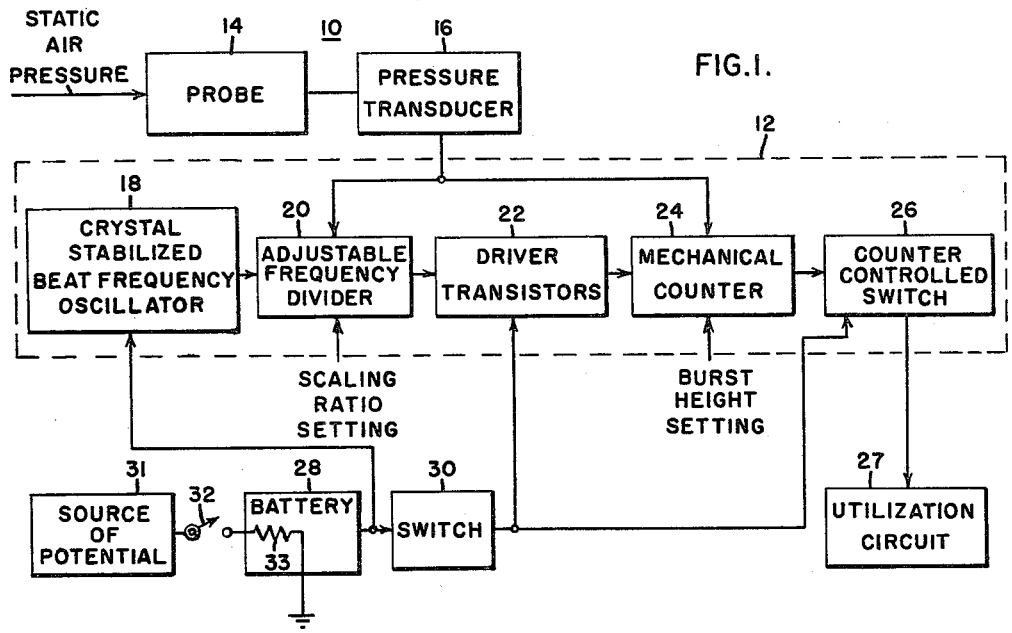
FIGURE 1 is a block diagram of a preferred embodiment of the invention.

Turning now to the drawings, in FIGURE 1 there is illustrated a preferred embodiment of the invention employing an apogee detector element 10 and a timer element 12. The apogee detector element 10 consists of a probe 14 and a pressure transducer 16. The input to probe 14 is the static air pressure which is transmitted to the pressure transducer 16.

Timer element 12 consists of a crystal stabilized beat frequency oscillator 18, an adjustable frequency divider 20, driver transistors 22, a mechanical counter 24, and a counter controlled switch 26. These timer elements are connected in series as recited. The output of pressure transducer 16 provides an input to adjustable frequency divider 20, which has as another input a provision for a scaling ratio setting. Mechanical counter 24 has as one of its inputs a burst height setting for presetting its count in the negative direction. A second input for reversing the count comes from transducer 16. The output of switch 26 is connected to a utilization circuit 27 which may be a fusing circuit in a warhead. A thermal battery 28 is connected to a switch 30. Battery 28 is actuated by means of a source of potential 31 through a switch 32 to a heater element 33. After actuation, thermal battery 28 is self-sustained. Battery voltage from battery 28 is applied to driver transistors 22 and counter controlled switch 26 through an acceleration or dynamic pressure switch 30 and directly to oscillator 18.

In implementing the embodiment illustrated in FIGURE 1, the following components may be employed. Probe 14 is similar to that disclosed in the above referenced co-pending application. Pressure transducer 16 is provided by a switch actuated by either a change in impedance or actual contact between the diaphragm and back plate of a pressure sensor such as described in the above referenced application. During ascent the internal pressure is higher, holding the diaphragm away from the back plate. At or shortly after apogee, the pressure differential reverses, deflecting the diaphragm. The crystal stabilized beat frequency oscillator 18 may be similar to the oscillator illustrated in "Theory and Application of Electron Tubes," by Reich, published by the McGraw Book Co., Inc., New York and London, 1939, on pages 348 and following. A transistorized version of this oscillator may also be employed in the interest of saving space, weight and minimizing power consumption and temperature rise. The adjustable frequency divider 20 may also be found in Reich at pages 458 and following. The counter illustrated in FIGURE 12–61a on page 460 of Reich provides an output on $VT_4$ for every eight (8) counts or oscillator pulses put into the input. This scale can obviously be changed by switching the input location or by taking the output at a different point in the circuit and resetting the circuit after the specified count in any one of a number of well known manners such as feedback.

Driver transistors 22 may be silicon controlled rectifiers connected in a manner of a standard thyratron output stage. The silicon controlled rectifiers are available from the Semiconductor Products Department of the General Electric Company, Syracuse, New York. The mechanical counter 24 may be similar to the Sigma Instrument Inc. Cyclonome counter described in U.S. Patent 2,834,896. Sigma is a corporation of Massachusetts. The counter controlled switch 26 may be any of a number of mechanical or electromechanical switches.

Battery 28 may be similar to the thermal battery DOFL PS 405 available from the Catalyst Research Corporation, of Baltimore, Maryland. Switch 30 may be similar to Model 532 acceleration switch available from the General Electric Missile and Space Vehicle Department, Philadelphia, Pennsylvania, and described in PIB 28 8–59).

Figure 2:
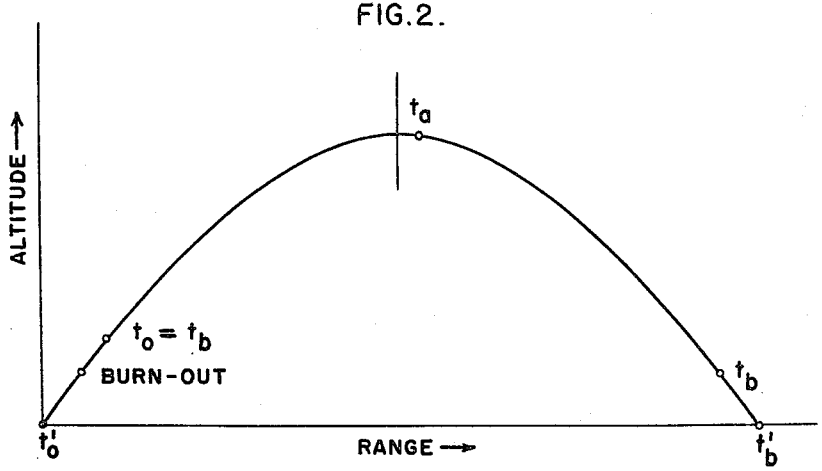
FIGURE 2 is a typical graph of range versus altitude for a missile indicating points on the trajectory of significance to the invention.

The operation of the embodiment disclosed in FIGURE 1 may be described in connection with the trajectory diagram illustrated in FIGURE 2. Before take-off burst height setting is preset into the system by presetting the mechanical counter 24 in the negative direction number of counts equivalent to the time before impact $t$ which it is desired to actuate the mechanism. A scaling ratio setting is also preset in adjustable frequency divider 20. This is done in accordance with the planned trajectory of the missile. An example of data for determining such a scaling ratio is plotted in the graph of FIGURE 4, which is a ratio between the time from launch to apogee versus the time from launch to burst for a number of random 35° elevation trajectories for a particular missile. Plots of this kind would be necessary for each type of missile at a number of different elevations over which firing is desired.

Figure 5A:
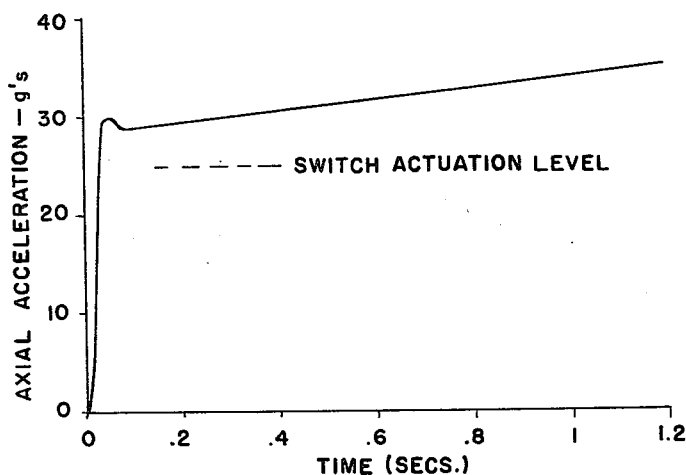
FIGURES 5A and 5B are graphs of time versus axial acceleration and dynamic pressure, respectively, in accordance with which acceleration or pressure switches similar to those illustrated in FIGURES 1 and 3 operate.
Figure 5B:
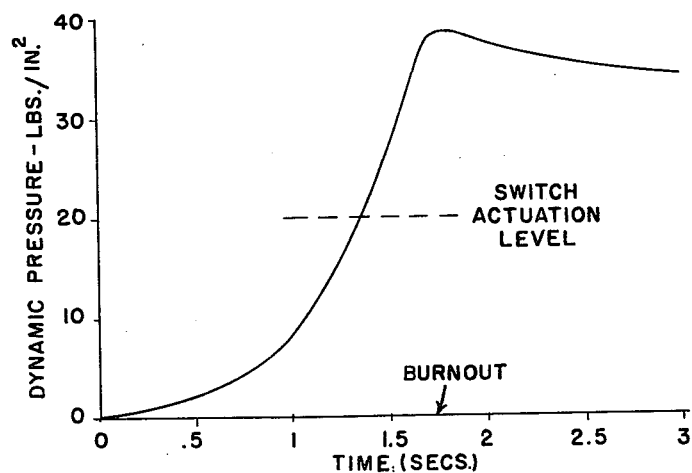

Power is supplied to oscillator 18 to allow it to stabilize directly from battery 28 which is allowed to heat up and come to voltage when switch 32 is closed before the missile is fired. Shortly after applying thrust to the missile, switch 30 is actuated, which in turn permits battery 28 to apply voltage to the driver transistors 22 and the counter controlled switch 26. Switch 30 may operate in response to acceleration in the manner of Model 532, above referenced, or may be a dynamic pressure switch. The operating characteristics for these two types of switches are illustrated in FIGURES 5A and 5B. It is obvious from these figures that the response of the acceleration sensitive switch is more rapid.

Returning to FIGURE 2, upon firing at $t'_0$ the system is actuated as described above and mechanical counter 24, which has been preset in the negative direction, commences to count in the positive direction at a rate controlled by the frequency of oscillator 18, as modified by the scaling ratio during ascent which has been preset in adjustable frequency divider 20. After going through the burn-out point illustrated in the trajectory, a point $t_0$ is reached after a time which is equal in time to the desired time of burst before impact or time from point $t_b$ to $t'_b$, which through as illustrated is different in distance in accordance with the above mentioned scaling ratio.

At this point $t_0$ counter 24 reaches zero and continues counting in the positive direction. Adjacent or shortly after apogee at point $t_a$, probe 14 and transducer 16 generate a signal indicating apogee. This signal is fed to adjustable frequency divider 20 to switch the scaling ratio to that preset for descent and to mechanical counter to change the direction of the count. Upon reaching point $t_b$ on the descending portion of the trajectory, counter 24 has returned to zero, at which time it actuates counter controlled switch 26, sending a signal from battery 28 to the utilization circuit 27 which is desired to be actuated at the particular altitude. At time $t'_b$ the missile impacts. It may be provided with an impact actuated device (not illustrated) to back up the system described above.

The switching diagram for the embodiment of FIGURE 1 is illustrated in FIGURE 3, where identical numerals are used for similar components to those in FIGURE 1, and operates as follows: A switch 32, which may be manual, is closed immediately before firing. This switch has one set of contacts in the heater circuit for the thermal battery 28 for applying a potential from source 31 to heating element 33, and a second set of contacts at a point in the circuit immediately before the utilization circuit 27. Battery 28 is connected to provide power to the oscillator 19 directly to allow it to stabilize in frequency before firing of the missile. Upon firing the missile acceleration or dynamic pressure switch 30 is actuated and applies voltage from battery 28 to the timer 34, apogee detector 10 and counter controlled switch 26. The burst height has been preset into timer 34 and the scaling ratio has been preset into oscillator 19, which as here illustrated is intended to include the oscillator 18 and the adjustable frequency divider 20 of FIGURE 1. Static pressure is shown as an input to the apogee detector 10 which has an output going to the oscillator 19 and to the timer 34 to switch the scaling ratio and the direction of the count, respectively, when an apogee signal is generated by detector 10. When timer 34 reaches count zero during descent, a signal is generated to actuate coil 36 of counter controlled switch 26, closing the circuit from battery 28 to the utilization circuit 27 in order to pass a signal to actuate whatever is desired in circuit 27.

Physically, and as illustrated in the above referenced co-pending application, the entire arming and fuzing system, if transistorized, may be contained in the forward nose section of the missile. Redundant systems may be employed to insure reliability. Present launch safety has been achieved by means of the manual safety switch 32, the need to activate the battery 28, and the need to activate timer 34 by means of switch 30. Since the system is entirely self-contained, the possibility of jamming is minimized. Jamming due to actuation of the apogee detector caused by projectiles bursting in the vicinity is minimized since the apogee detector diaphragm is normally against the stops, except in the immediate vicinity of apogee, as described in the above referenced co-pending application.

While a particular embodiment of the invention has been illustrated and described, it should be understood that the invention is not limited thereto, and that it is intended by the appended claims to cover all variations that fall within the true spirit and scope of the invention.

What is claimed as new and desired to be secured by Letters Patent of the United States is:

1. A trajectory sensitive time fuze system for a missile comprising an apogee detector, a timer, means for presetting said timer in one direction, means responsive to firing of the missile for causing said timer to commence counting in the direction opposite said one direction, means responsive to a signal indicating apogee to said apogee detector for reversing the direction of counting of said timer, and means responsive to said timer returning to zero count for providing an actuating signal.

2. A trajectory sensitive time fuse system for a missile comprising an apogee detector, a timer including an adjustable frequency divider, means for presetting said timer in one direction, means for presetting a counting scaling ratio of ascent rate to descent rate into said divider, means responsive to firing of the missile for causing said timer to commence counting in the direction opposite to said one direction in accordance with said ascent rate of said divider, means responsive to a signal indicating apogee from said apogee detector for reversing the direction of counting of said timer and for causing it to count in accordance with said descent rate preset in said divider, and means responsive to said timer returning to zero count for providing an actuating signal.

3. A trajectory sensitive time fuse system for a missile comprising an apogee detector, a timer, means for presetting said timer in one direction, means responsive to firing of the missile for causing said timer to commence counting in the direction opposite said one direction, means responsive to a signal indicating apogee from said apogee detector for reversing the direction of counting of said timer, means responsive to said timer returning to zero count for providing an actuating signal, and a utilization circuit connected to the output of said timer for receiving said actuating signal.

4. A trajectory sensitive time fuse system for a missile comprising an apogee detector, a timer including an adjustable frequency divider, means for presetting said timer in one direction, means for presetting a counting scaling ratio of ascent rate to descent rate into said divider, means responsive to firing of the missile for causing said timer to commence counting in the direction opposite said one direction in accordance with said ascent rate of said divider, means responsive to a signal indicating apogee from said apogee detector for reversing the direction of counting said timer and for causing it to count in accordance with said descent rate preset in said divider, means responsive to said timer returning to zero count for providing an actuating signal, and a utilization circuit connected to the output of said timer for receiving said actuating signal.

5. A trajectory sensitive time fuse system for a missile comprising an apogee detector; a timer including an adjustable frequency divider, a frequency stabilized oscillator and a count registering portion; means for presetting said timer in one direction; means for presetting a counting scaling ratio of ascent rate to descent rate into said divider; a thermal battery; a source of potential; means for providing a signal from said source to actuate said thermal battery prior to firing the missile; an acceleration sensitive switch; means for connecting the output of said thermal battery directly to said frequency stabilized oscillator and through said acceleration sensitive switch to the count registering portion of said timer, said acceleration sensitive means being responsive to the firing of the missile for causing said timer to commence counting in the direction opposite said one direction in accordance with said ascent rate of said divider; means responsive to a signal indicating apogee from said apogee detector for reversing the direction of counting of said timer and causing it to count in accordance with said descent rate preset in said divider; means responsive to said timer returning to zero count for providing an actuating signal; and a utilization circuit connected to the output of said timer in order to receive said actuating signal.

6. A trajectory sensitive time fuse system for a missile comprising an apogee detector for sensing static air pressure and providing an output signal at apogee including a probe and a pressure transducer; a timer element including a count generating sub-element containing a crystal stabilized beat frequency oscillator and an adjustable frequency divider, and a counting sub-element including driver transistors, a mechanical counter and a counter controlled switch; a thermal battery; a source of potential connected through a switch to an actuating element in said thermal battery; means connecting the output of said thermal battery directly to said beat frequency oscillator; an acceleration sensitive switch; means connecting the output of said thermal battery through said acceleration sensitive switch to said driver transistors and said counter controlled switch; means for presetting an ascent-descent scaling ratio into said adjustable frequency divider; means for presetting a burst height setting into said mechanical counter; means for connecting the output of said pressure transducer to said adjustable frequency divider for switching said scaling ratio at apogee; means for connecting the output of said pressure transducer to said mechanical counter for reversing the direction of count at apogee; and a utilization circuit connected to said thermal battery through said counter controlled switch and said acceleration sensitive switch for receiving an actuating signal when said mechanical counter returns to zero after the missile passes apogee.

7. A trajectory sensitive fusing system for a missile comprising: a counter having two modes of operation, a first mode in which it adds electrical pulses applied to it and a second mode in which it subtracts electrical pulses applied to it, said counter being capable of being set to a predetermined value; means for initially setting said counter at a predetermined negative value; an electrical pulse producing network; prior to the launch of said missile said counter being in its first mode of operation; a launching switch for connecting the pulses produced by said pulse producing network to said counter at the time said missile is launched; an apogee detector for sensing when the missile reaches apogee and for producing an apogee signal at apogee; means for applying said apogee signal to said counter; said counter in response to said apogee signal being changed to its second mode of operation; and means connected with said counter for producing a fusing signal when the accumulated total of said counter reaches zero after the apogee detector has produced its apogee signal.

8. A trajectory sensitive fusing system for a missile comprising: a counter having two modes of operation, a first mode in which it adds electrical pulses applied to it and a second mode in which it subtracts electrical pulses applied to it, said counter being capable of being set to a predetermined value; means for initially setting said counter at a predetermined negative value; an electrical pulse producing network; said network having a first operating condition and a second operating condition; said network in its first condition producing pulses at a first predetermined rate, and in its second condition producing pulses at a second predetermined rate; prior to the launch of said missile said counter being in its first mode of operation and said network being in its first condition; a launching switch for connecting the pulses produced by said pulse producing network to said counter at the time said missile is launched; an apogee detector for sensing when the missile reaches apogee and for producing an apogee signal at apogee; means for applying said apogee signal to said counter and said pulse producing network; said counter in response to said apogee signal being changed to its second mode of operation and said pulse producing network being changed to its second condition; and means connected with said counter for producing a fusing signal when the accumulated total of said counter reaches zero after the apogee detector has produced its apogee signal.

9. A trajectory sensitive fusing system for a missile comprising: a mechanical counter having two modes of operation, a first mode in which it adds electrical pulses applied to it and a second mode in which it subtracts electrical pulses applied to it, said counter being capable of being set to a predetermined value; means for initially setting said counter at a predetermined negative value; an oscillator adapted to produce pulses of substantially constant frequency; a frequency divider network to which the output pulses of said oscillator are applied; said network having a first operating condition and a second operating condition; said network in its first condition producing pulses having a first predetermined ratio with respect to the pulses applied to it, and in its second condition producing pulses having a second predetermined ratio with respect to the pulses applied to it; prior to the launch of said missile said counter being in its first mode of operation and said frequency divider network being in its first ondition; a launching switch for connecting the pulses produced by said frequency divider network to said counter at the time said missile is launched; an apogee detector for sensing when the missile reaches apogee and for producing an apogee signal at apogee; means for applying said apogee signal to said counter and said frequency divider network; said counter in response to said apogee signal being changed to its second mode of operation and said frequency divider network being changed to its second condition; and means connected with said counter for producing a fusing signal when the accumulated total of said counter reaches zero after the apogee detector has produced its apogee signal.

References Cited in the file of this patent
UNITED STATES PATENTS
2,940,392    Loren et al. _____ June 14, 1960

UNITED STATES PATENT OFFICE

CERTIFICATE OF CORRECTION

Patent No. 3,067,684 December 11, 1962

Harold W. Euker et al.

It is hereby certified that error appears in the above numbered patent requiring correction and that the said Letters Patent should read as corrected below.

Column 4, line 64, for "to", second occurrence, read -- from --.

Signed and sealed this 4th day of June 1963.

(SEAL)
Attest:

ERNEST W. SWIDER
Attesting Officer

DAVID L. LADD
Commissioner of Patents